United States Patent [19]

Soltysiak

[11] Patent Number: 4,681,294

[45] Date of Patent: Jul. 21, 1987

[54] RESILIENT SUSPENSION FOR CONDUITS

[75] Inventor: Peter Soltysiak, Berlin, Fed. Rep. of Germany

[73] Assignee: Mannesmann Aktiengesellschaft, Duesseldorf, Fed. Rep. of Germany

[21] Appl. No.: 643,678

[22] Filed: Aug. 24, 1984

[30] Foreign Application Priority Data

Sep. 2, 1983 [DE] Fed. Rep. of Germany ....... 3332098

[51] Int. Cl.$^4$ .............................................. F16L 3/00
[52] U.S. Cl. .................................... 248/613; 248/578; 248/59
[58] Field of Search .............. 248/613, 578, 575, 610, 248/574, 58, 59, 542; 52/573; 411/243, 222, 204, 223; 285/302, 298

[56] References Cited

U.S. PATENT DOCUMENTS

| 1,091,692 | 3/1914 | Mueller et al. | 285/302 X |
|---|---|---|---|
| 1,127,559 | 2/1915 | Willison | 411/243 |
| 2,335,833 | 11/1943 | Wood | 248/542 |
| 2,420,276 | 5/1947 | Wood | 248/613 X |
| 2,908,491 | 10/1959 | Suozzo | 248/542 X |
| 2,979,297 | 4/1961 | Suozzo | 248/575 X |
| 3,102,706 | 9/1963 | Goldsmith | 248/613 X |
| 3,637,174 | 1/1972 | Kuo | 248/542 |
| 4,026,507 | 5/1977 | Thiedemann | 248/613 X |
| 4,485,998 | 12/1984 | Kowalski et al. | 248/613 X |

Primary Examiner—Ramon S. Britts
Assistant Examiner—Karen J. Chotkowski
Attorney, Agent, or Firm—Ralf H. Siegemund

[57] ABSTRACT

A tension rod for the immediate suspension of a conduit is provided with a threaded-on abutment element for abutment of a spring casing from above or from below. The spring casing contains a compression spring for tensioning between the bottom of the casing and a spring disk secured to the tension rod, an internal sleeve extending from the bottom of the casing prevents complete compression of the spring; the threaded on abutment adjustably limits decompression of the spring; through supplemental structure the tension rod can be locked to the casing in a load independent fashion.

2 Claims, 2 Drawing Figures

RESILIENT SUSPENSION FOR CONDUITS

BACKGROUND OF THE INVENTION

The present invention relates to the resilient suspension of tubular conduits.

Suspensions of the type to which the invention pertains requires that a spring contained, for example, within a casing is dimensioned to be able to support the weight of a conduit being suspended generally on a tension rod. In the case of a tube for the conduction of steam, it will be observed, however, that the weight of the steam is neglected in calculating the pertinent weight. Moreover, such conduits have to be inspected from time to time with regard to their pressure tightness. For this purpose they are filled with water, which of course increases the weight for the purposes of tests, thus significantly raising the load which the conduits exert upon their suspension. In practice, it was found that a resilient suspension facility may in fact become overloaded. They will be completely compressed thereby losing all of the resiliency. Another instance has to be observed in that it may be necessary at times to release the conduit or a portion thereof from the suspension. In such an instance the bias of the spring must actually be removed because the load is in fact omitted in its entirety.

Considering these various abnormal conditions, it has been suggested to provide certain stops or locking mechanisms for such resilient suspension facilities, including, for example, bolts or pins which lock the tension rod with the spring housing in a force transmitting relatioship. Other locking mechanisms are known, for example, the spring disks may be positively connected to the spring housing through an appropriate pin. In still other versions, it is known to provide teeth in the housing to be engaged with toothed locking sheets.

In all these instances one has to expect difficulties whenever the pins to be inssserted cannot be inserted because it requires generally that certain bores in the system are aligned, but on account of variations in loading, this alignment is not obtained so that the locking pin insertion cannot take place. This situation involves, for example, instances of bores in the tension rod or the spring disk or the housing, or the like. In practice of course one will try to manipulate the equipment to restore the requisite alignment, for example, through lifting of the tubing, however, this is a manual operation and may require a considerable force that is not necessarily commensurate with the requisite precision of alignment.

DESCRIPTION OF THE INVENTION

It is an object of the present invention to provide a new and improved resilient suspension for tubes permitting an adjustment of the locking position in any disposition of the spring vis-a-vis a load supporting tension rod, and in a further relation to the spring housing. Moreover, the resilient suspension is to be constructed so that the locking position permits a suitable adjustment of the bias of the spring suspension on a steady scale.

Therefore, it is a particular object of the present invention to provide a resilient suspension for conduits using a compression spring arranged inside a spring housing and being tensioned between the bottom of the housing and a disk being connected to a tension rod and wherein a load carrier is threadedly secured to one end of the tension rod.

In accordance with the preferred embodiment of the present invention, the specific object is attained by providing the tension rod with an outer threading for threading on a stop member which bears against this spring housing, and inside of the spring a sleeve is provided which receives in radially spaced apart relationship the tension rod, and extends from the housing towards the disk, the axial dimension of this sleeve is slightly larger than the axial dimension of this spring whenever the spring is completely compressed. There should be a spacer ring made of synthetic material provided between the tension rod and the first mention sleeve.

Preferably the sleeve extends from the case bottom. The threaded-on stop is constructed as an abutment annulus which bears against one axial front face of the sleeve. A supplemental sleeve may be provided to grip around the abutment ring and to be threaded onto a threaded portion of the first mentioned sleeve which extends beyond the spring housing, but is otherwise freely movable. This supplemental sleeve locks the tension rod against the casing.

The abutment ring preferably has an axial bore traversing its inner thread for insertion of a pin made of a soft synthetic and being amenable with its outer periphery to be squeezed into the outer threading of the tension rod. Alternatively, the abutment ring may be provided with a radial bore into which a soft synthetic screw can be threaded. Either lock locks the stop ring to the tension rod.

As an alternative embodiment for a stop member the tension rod could be extended beyond the disk, and on the outer threading of the tension rod a threaded sleeve is threaded which is slidingly received in the cover of the casing. Moreover, this threaded sleeve is to have a collar bearing on the inside of the cover of the casing.

The inventive construction offers the advantage that the abutment or stop member is displaceable relative to the tension rod, the abutment being constructed as annulus or sleeve, and threaded theron, and therefore can assume any disposition vis-a-vis the tension rod with reference to the spring housing or casing to obtain an engagement therewith. And in this fashion it can serve as an abutment so that in the case of a no-load condition, the tension of the spring is retained. In other words, the spring remains biased. In case of an increase of the load, the sleeve provided in the interior of the casing serves as abutment for the spring disk so that a blocking position of the spring is safely avoided.

DESCRIPTION OF THE DRAWINGS

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings in which:

Figure 1:
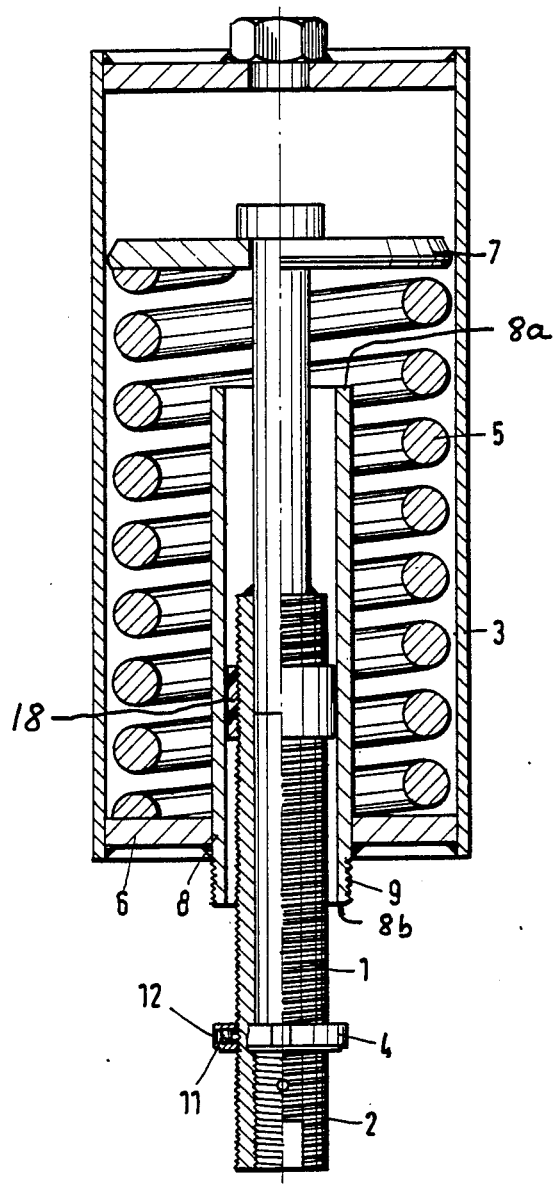
FIG. 1 is a longitudinal section through an example of the preferred embodiment of the present invention for practicing the best mode thereof, the resilient suspension as illustrated is shown in a non-abutment position.
Figure 2:
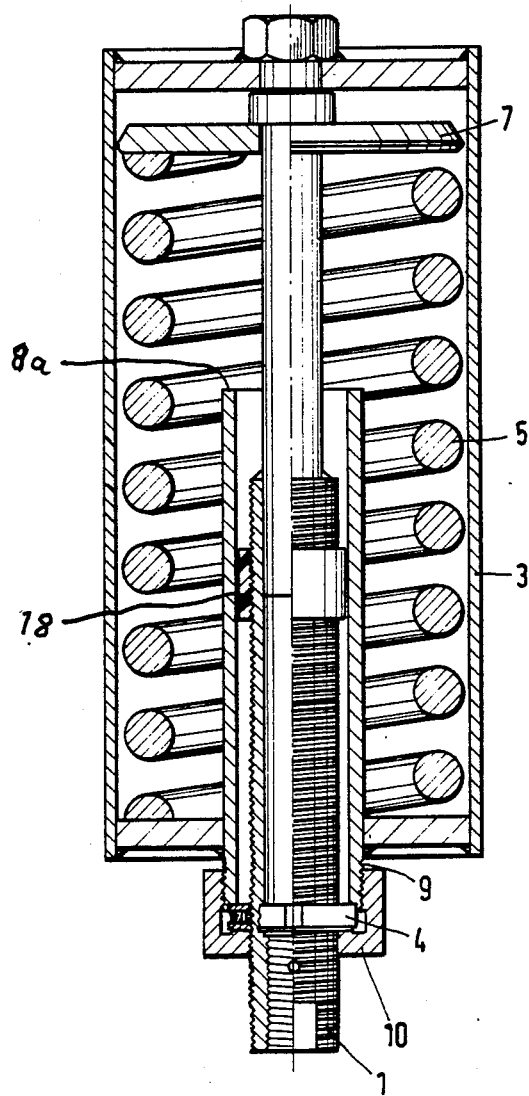
FIG. 2 shows the same suspension device as FIG. 1 but in one of the two stop positions of the tension rod.
Figure 3:
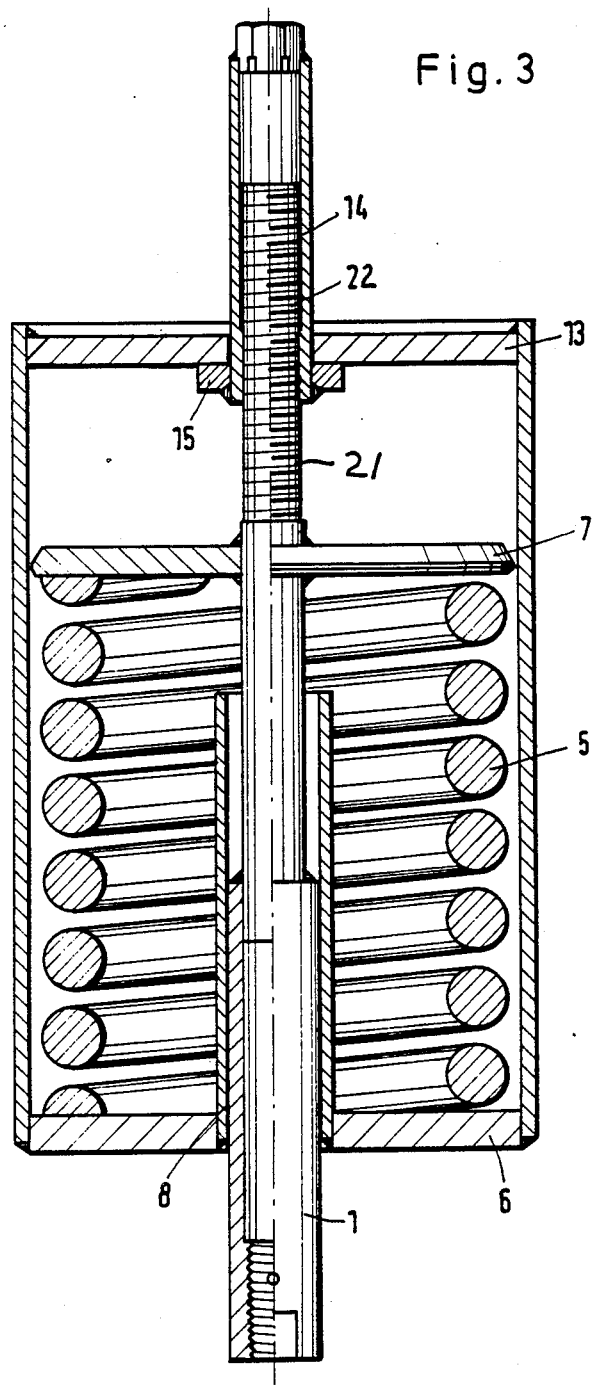

Proceeding now to the detailed description of the drawing, reference is made first to FIGS. 1 and 2. The inventive resilient suspension device includes a spring casing 3 which contains a compression spring 5 in coaxial relation. This compression spring 5 is biased and tensioned in between a bottom 6 of the casing 3 on one hand, and a spring disk 7 on the other hand. A tension rod 1 is secured centrally and coaxially with the disk 7. The tension rod 1 has a threading, and particularly a threading portion 2 is provided near the lower end of the rod 1 for threading on a load bearing carrier or the like (not shown, conventional), which in turn is connectable to a tube or conduit. The conduit itself is likewise not shown. The portion of the rod to which this load bearing carrier or suspension device is connected projects from the casing 3 through the bottom 6 and below thereof.

The tension rod 1 is received in parts by a sleeve 8 which is radially spaced from the rod, and being in turn circumscribed by the spring 5. The sleeve 8 likewise projects to some extent below the bottom 6 of the casing 3. As illustrated in FIG. 1, the sleeve 8 to the extent it projects into casing 3 has an axial dimension which appears to be shorter than the axial dimension of the spring 5. However, the dimensions are chosen such that in the case of a full compression of the spring 5, that spring will in fact have an axial dimension smaller than the axial dimension of the sleeve 8 inside casing 3. Therefore, the upper end 8a of the sleeve 8 can in fact serve as abutment and stop for the spring disk 7 whenever the compression of the spring reaches a near limit situation. This will occur when the load on the tension rod is in fact too high, and establishes one stop position of and in the device. In fact, then, the spring will not be completely compressed.

An abutment ring 4 is threaded onto the threading 2 of the tension rod 1. Independently from the position of the tension rod vis-a-vis the casing 3, the abutment ring 4 may be brought into abutment with the lower front face 8b of the sleeve 8. This specific position of abutment is shown in FIG. 2. This feature then limits the expandability of the spring and constitutes the second stop position for rod 1.

FIG. 2 illustrates moreover a supplemental sleeve 10 which is threaded onto the sleeve 8, threading 9 thereof. This supplemental sleeve 10 has a collar portion by means of which it can reach under the ring 4. This means that the sleeve 10 by being threaded onto the sleeve 8 in variable positions can prevent the downward displacement of the tension rod 1 via the annulus 4 as threaded on the tension rod 1, namely whenever the ring 4 abuts the inwardly extending collar of the supplemental sleeve 10.

The ring 4 moreover is provided with a radial bore 11 into which a set screw 12 can be threadedly inserted. Preferably a rather soft synthetic material is used for that purpose. The tip of the screw can engage the thread 2 in whatever disposition ring 4 has been threaded to now lock the abutment ring 4 against unwanted displacement to thereby positively define the disposition of the ring on the tension rod 1, which of coure is an adjustable position vis-a-vis the abutment position it may attain under certain load conditions as against the axial front face 8a of the sleeve 8. Another feature which can be observed is a sleeve 18 being a spacer made of synthetic material. This sleeve 18 is also threaded onto the tension rod 1, and slidingly abuts against the interior of the sleeve 8.

The locking position of the ring 4 can in the alternative be attained by a pin which is likewise made of a soft synthetic material, but which axially traverses the thread of the ring 4, and can be wedged into the thread of the tension rod 1 to accordingly lock the ring 4 into the adjusted position.

It can thus be seen that the ring 4 can be threaded onto the tension rod 1 and arrested thereon in a particular position. This then establishes a limit on the expansion of the spring 5. In other words, the spring 5 is never being fully decompressed, but the decompression is limited by the extent of axial displacement permitted by the ring 4. On the other hand, the axial dimension of the spring 5 vis-a-vis the axial dimension of the sleeve 8 limits the amount of compression the spring 5 may undergo before being blocked. The supplemental sleeve 10 shown in FIG. 2 permits locking the tension rod 1 in a position in which irrespective of the load conditions on the tension rod 1, the abutment ring 4 is forced against the lower end of the sleeve 8. These various dispositions of adjustment are finely and accurately adjustable simply through the threading of the ring 4 on rod 1 and the threading of sleeve 10 on sleeve 8.

The invention is not limited to the embodiments described above, but all changes and modifications thereof not constituting departures from the spirit and scope of the invention are not intended to be included.

I claim:

1. A resilient suspension for tubular conduits comprising:
    a tubular casing having a bottom;
    a first sleeve extending into the casing as well as from the bottom out of the casing, and being mounted to said bottom;
    a compression spring in said casing receiving said sleeve and bearing with one end against the said bottom;
    a tension rod having a spring disk affixed thereto, the spring disk being situated in said casing, said compression spring with its other end bearing against said spring disk;
    said first sleeve to the extent it extends into that casing having an axial dimension slightly larger than the axial dimension of said spring when fully compressed;
    a ring-shaped stop means threaded onto the tension rod therebey abutting a portion of the first sleeve that extends from the bottom of the casing for limiting, through such abutment a displacement of the tension rod commensurate to decompression of said spring, for preventing complete decompression of the spring; and
    a supplemental sleeve provided for threading onto the portion of the first sleeve that extends from the bottom of the casing, gripping around the ring for holding the ring against the first sleeve, to thereby lock the tension rod against the casing.

2. Resilient suspension as in claim 1, there being a synthetic spacer provided between the first sleeve and the tension rod, the spacer being threaded on the tension rod and slidable vis-a-vis the first sleeve.

* * * * *